March 5, 1968          A. WURZ          3,372,230

TEMPERATURE SCANNING APPARATUS

Filed March 31, 1965          3 Sheets-Sheet 1

INVENTOR.
ALBERT WURZ
BY Frank D Prager
ATTORNEY

March 5, 1968 A. WURZ 3,372,230

TEMPERATURE SCANNING APPARATUS

Filed March 31, 1965 3 Sheets-Sheet 3

INVENTOR.
ALBERT WURZ

BY
Frank D. Pryga
ATTORNEY

3,372,230
TEMPERATURE SCANNING APPARATUS
Albert Wurz, North Wales, Pa., assignor to Philco-Ford Corporation, a corporation of Delaware
Filed Mar. 31, 1965, Ser. No. 444,367
2 Claims. (Cl. 178—6.8)

ABSTRACT OF THE DISCLOSURE

Apparatus for determining and displaying temperature patterns. A reflector is mounted for rocking and rotary motions, and is combined with individually illuminated light shutter members which partake of these motions. Thermal radiations, to be determined and displayed, are transmitted by this reflector to a transducer to control the cathode of a cathode ray tube. Electric signals are derived from the illumination passed by the shutter members to control the deflectors of the cathode ray tube.

---

This invention relates to scanning apparatus, particularly for the scanning of radiation patterns. Such apparatus is used in particular for observing and picturing temperature patterns, as is described in a copending application, filed by Bruce G. Marks and George Revesz under Ser. No. 443,561 on Mar. 29, 1965, and assigned to my assignee.

As shown by Marks and Revesz, temperature patterns can be displayed pictorially when a scanning and focusing unit, comprising a mirror mounted for certain compound motions, transfers the details of such patterns to a suitable thermo-electric transducing and electro-visual picturing unit. It is a primary object of this invention to provide the scanning apparatus for such purposes. It is a further object to provide an accurate and inexpensive temperature scanner, and in particular to provide a scanning mirror device which performs relatively rapid rotation coincident with slower rocking motions.

It is necessary to synchronize the scanner with the picturing device in a precise way, and for this purpose it was found best to derive positional information from the scanner and to apply it to the picturing device. In this connection it was further found desirable to perform the several coincident motions of the scanner in a way wherein the resulting positional changes of the mirror correspond linearly with the successive time intervals of the scanning process. Such an arrangement is needed to represent the temperature pattern without distortion. It is a further object of my invention to provide such an arrangement.

Toward these objectives the invention provides a new radiation scanning device, characterized by the use of a mirror which is rotated and simultaneously rocked with the aid of a novel combination of motorized equipment and frame structures. In a preferred form of the invention the motorized mirror drive performs the rocking operation by a cam motion, and also operates a pair of slotted discs which are used as part of an electronic pickup system providing positional information to synchronize the scanner with the sweep circuits of a picture tube.

Figure 1:
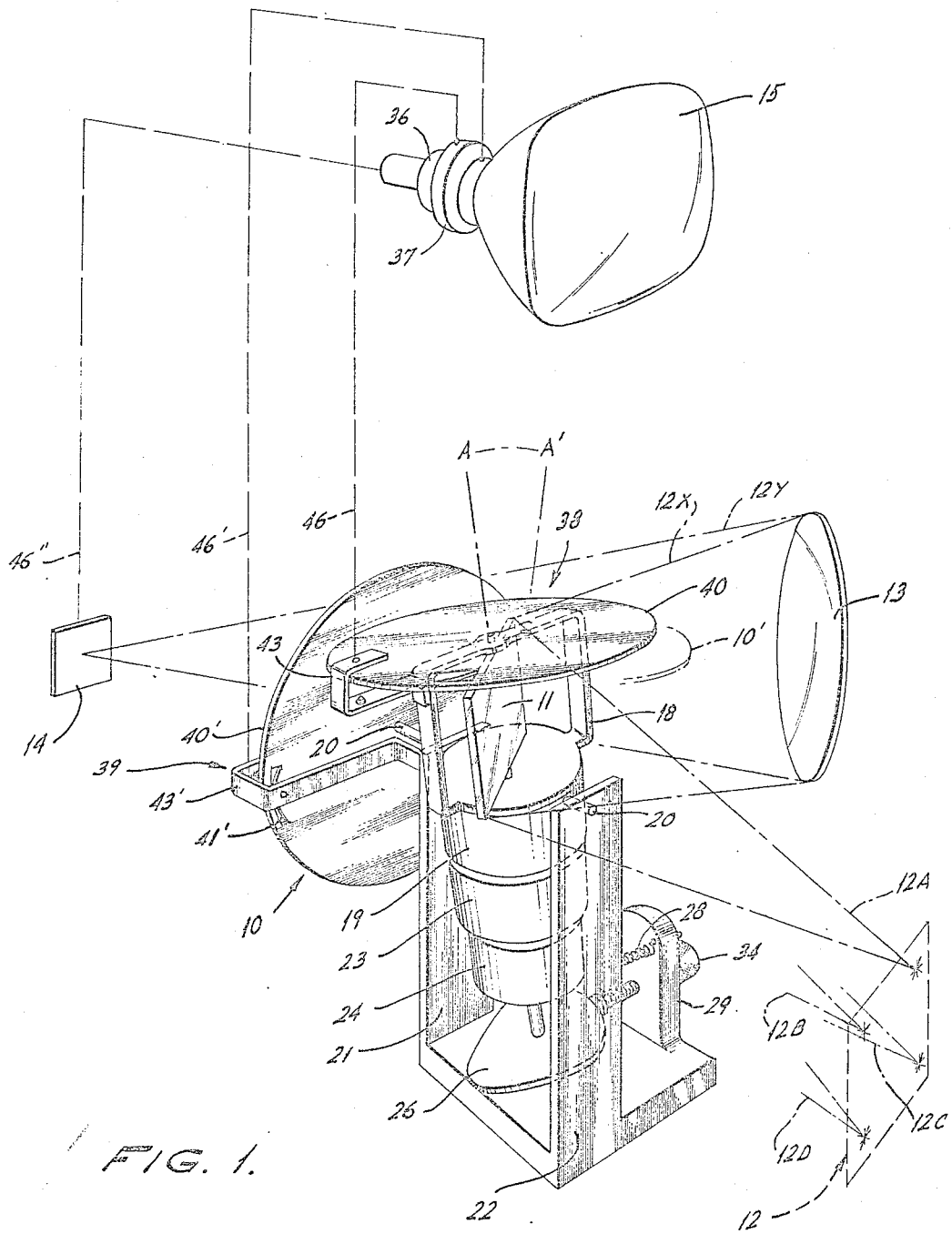
Figure 2:
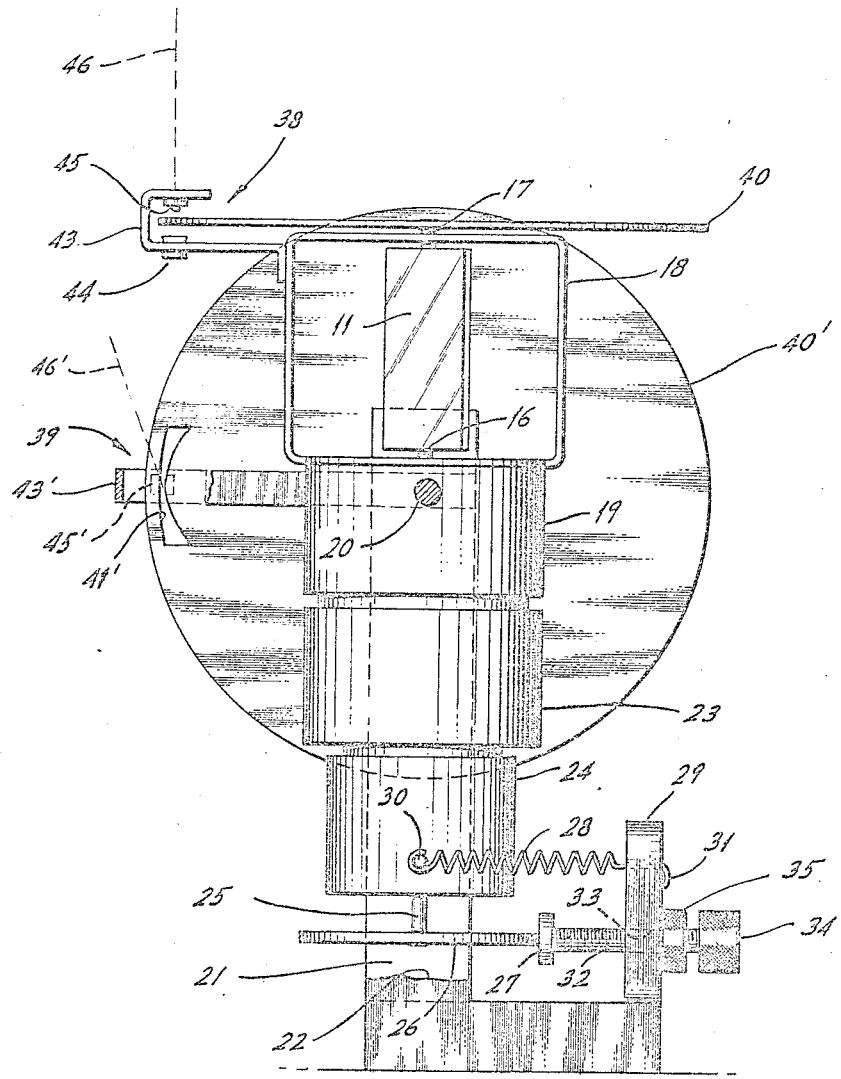
Figure 3:
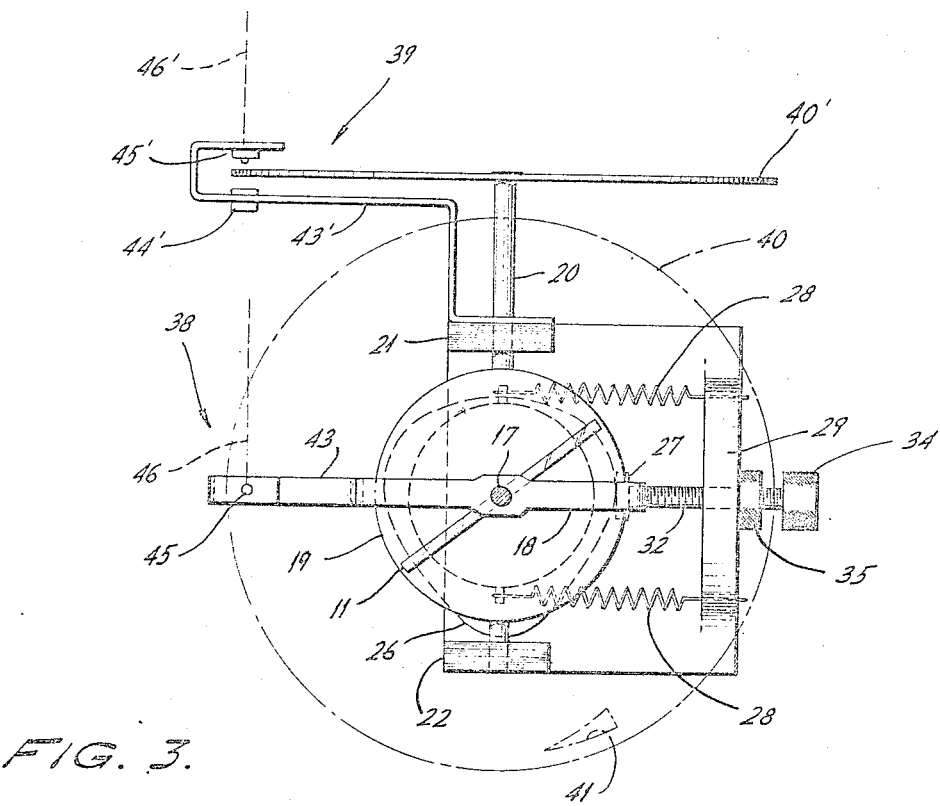
Figure 4:
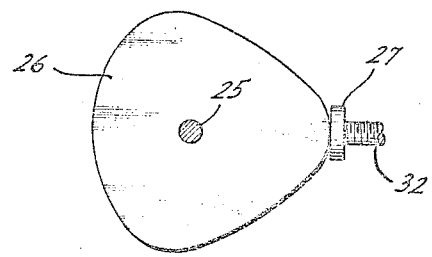
Figure 5:
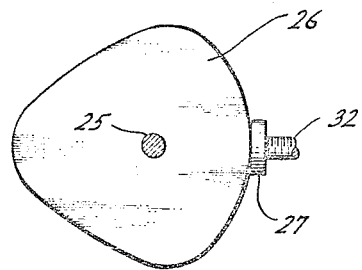

In the drawing appended hereto, FIGURE 1 is a perspective view of a temperature sensitive system, including the new scanning apparatus. FIGURE 2 is a side view of the scanning apparatus. FIGURE 3 is a plan view of the same, and FIGURES 4 and 5 are fragmentary plan views showing a detail in different positions.

Referring first to FIGURE 1, the illustrated system includes scanning apparatus 10 which comprises a flat scanning mirror 11, movably mounted in front of heat radiating surface 12. Mirror 11 revolves rapidly, and rocks more slowly, to scan this object surface to receive the different infrared radiations 12A etc. which emanate from the various portions of this surface. Scanning mirror 11, with the aid of a focusing mirror 13, transfers these various radiations to a thermo-electrical transducing unit schematically shown at 14, for the control of a visual display device such as cathode ray tube 15. In the illustrated arrangement radiation 12A is obliquely incident on mirror 11, and continues in a zigzag path 12X, 12Y, first to mirror 13 and then convergently therefrom, behind scanner 10, to transducer 14.

As best shown in FIGURE 2, scanning mirror 11 is pivoted by upper and lower stub shafts 16, 17 in a rigid frame 18, which is rigidly secured to the top of a gear housing 19, thereby insuring accurately circular motions of the revolving mirror. The gear housing has trunnions 20 which are pivoted (FIGURE 1) in upstanding arms 21, 22 of a stationary mounting-frame to provide for controlled rocking motions of the scanner from one position (shown in full lines) to another (indicated at 10' in FIGURE 1).

Gear housing 19 contains a gear train, not shown, which is powered by a motor 23 rigidly secured to this housing and depending therefrom. This motor also drives an additional gear unit 24, the housing of which is rigidly secured to the bottom of the motor. The latter gear unit, as best shown in FIGURE 2, has an output shaft 25 driving a cam 26. The cam bears against a stationary stop 27, while suitable biasing means such as springs 28 (also see FIGURE 3) urge the lower gear housing toward the stop. For this purpose each spring 28 has one end connected to a pin 30 on lower gear housing 24 and has another end 31 shaped and bent to anchor it in an extension 29 of the stationary frame. Extension 29 is used also to mount stop 27, by stud 32, in a threaded aperture 33, in such a way that the position of the stop can be adjusted by knob 34, and can then be fixed by nut 35.

As best shown in FIGURES 3 to 5, cam 26 has a specially curved peripheral outline or edge, providing cam portions with long, short and intermediate radii from shaft 25 to the edge. FIGURE 3 shows one of the portions with intermediate radius contacting stop 27; FIGURE 4 shows the portion of longest radius in such contact; and FIGURE 5 shows the portion of shortest radius in such contact. It will readily be understood that rotation of the cam, with successive edge portions in contact with stop 27, causes the drive and mirror unit to rock on its pivots 20, thereby causing springs 28 to be extended and to contract cyclically. Such rocking can be performed for instance in cycles of a few seconds of time, and in such a way that the center line of rotation of the mirror, FIGURE 1, moves between terminal positions A and A' at a uniform speed, for instance at a speed of a certain number of seconds of arc per millisecond of time, thereby providing substantially linear scanning of object 12. This is achieved in a known way by suitably forming the contact surfaces of stop 27 and cam 26 (both shown in the drawing but without an attempt to reproduce their exact form.)

For the indicated purposes it is preferred that motor 23 be of so-called synchronous type, which operates at substantially uniform speed (synchronously with an ideal time standard) during all time intervals. Mirror 11 then rotates at the same speed throughout its operation, thereby providing substantially linear horizontal scanning of heat source 12, and in particular, properly indexing the start and end of each horizontal scan with predetermined phases of the vertical scan.

Coincidentally with the scanning of object 12 by mirror 11, a cathode ray scans the screen of picture tube 15, the ray being deflected for this purpose by the usual horizontal and vertical deflector coils 36, 37. The operation of these coils is synchronized with the rotating and rocking scanner motions, respectively, for which purpose positional information is transferred from the scanner to the cathode ray tube by a pickup system comprising a first pickup unit 38 responding to the rotation of mirror 11, and by a second pickup unit 39 responding to the rocking motions of the drive unit.

As shown in FIGURES 1, 2 and 3 each pickup unit comprises a disc 40, 40' with a specially shaped slot 41, 41' therein, and further comprises a light emitting and light responsive unit, rigidly mounted on one of support arms 21, 22 in the case of unit 38 and on mirror frame 18 in the case of unit 39. Each of these units includes a bracket 43, 43', for said rigid mounting thereof, and also includes a light source 44, 44' on one side of the slotted disc, and a photocell 45, 45' on the other side of said disc. The arrangement is such that light from the light source is admitted only through the slot in the moving disc, to the photocell. The slot in each moving disc passes the light only in amount linearly proportional to one of the motions of the scanning mirror, for which purpose each slot is suitably wedge-shaped and each disc, as already noted, moves in exact accordance with one of said mirror motions. More specifically, slot 41 in horizontal, rotating disc 40 has a shape of a single wedge, curved to suit the outline of the disc, whereby proper positional signals are derived from photocell 45, in response to the rotary motions of the mirror and for transmission to horizontal deflector coil 36 (FIGURE 1), through a suitable electrical line diagrammatically shown at 46. Vertical disc 40' is substantially similarly slotted (41) to provide positional signals from the rocking of the unit by means of light cell 45', for transmission to coil 37 through a line 46'.

Referring once more to FIGURE 1 and considering the *operation* of the new apparatus: this operation can begin for instance in the position of the scanner illustrated in full lines, wherein mirror 11 transmits radiation 12A from a lateral upper portion of object 12 to focusing mirror 13, and thereby to transducer 14 which transmits a corresponding signal through line 46" to imaging unit 15. Operation of motor 23 causes the mirror to rotate relatively rapidly so as to transmit radiation, subsequently, from other upper portions of the object and in due course to transmit radiation 12B from opposite upper portion, whereafter rotating mirror 11 faces only background areas and for some time transmits no further significant radiation to the focusing, transducer and imaging system 13, 14, 15. The mirror continues to rotate and therefore returns to a position in which it again faces that general object portion wherefrom radiation 12A was received; however, in the meantime motor 23 by cam 26 and stop 27 has effected a small increment of rocking motion, and the mirror faces a slightly lower point. The indicated operations continue until a final rotation of mirror 11, completing the first half of the first rocking cycle, causes the mirror to transmit lowermost radiation 12C, followed by 12D. Subsequently, there follows a reverse rocking motion, with transmission of radiations from points adjacent and above 12C-12D and finally again 12A-12B, thereby completing the second half of a rocking cycle.

Such cycles and reverse cycles follow one another so long as the unit operates, and in these operations the combination of scanning and focusing mirrors transmits successive radiations of different strength to the sensing system. Thereby the system is caused to produce a corresponding display on the picture screen, as has been described more fully in the Marks and Revesz application. By virtue of the new construction of scanner 10 the display is in substantially exact accordance with the radiation pattern 12A, 12B, 12C, etc. to be displayed.

While only a single embodiment of the new scanner has been described, the details thereof are not to be construed as limitative of the invention. The invention contemplates such variations and modifications as come within the scope of the appended claims.

I claim:
1. Apparatus for displaying varying temperature patterns of a surface, comprising:
   a reflector mounted in front of said surface and having means for moving it in rocking motion about a horizontal axis and in rotary motion about another axis at a speed more rapid than said rocking motion;
   a pair of light shutter members, one coupled to said reflector to share said rocking motion and the other coupled to said reflector to share said rotary motion;
   means to illuminate said shutter members individually;
   thermo-electric transducer means constructed and arranged to receive thermal radiation from successive parts of said surface by means of the rocking and rotating reflector;
   photoelectric transducer means for producing electric signals in response to illumination passed in successive positions of the two shutter members; and
   a cathode ray tube unit for displaying successive electric outputs of the thermo-electric transducer means, under control derived from the electric signals of the photoelectric transducer means.

2. Apparatus as described in claim 1 wherein said reflector is a flat mirror, and each shutter member has a single perforation pattern extending over a limited peripheral portion of a circle about the respective axis.

References Cited

UNITED STATES PATENTS

| | | | |
|---|---|---|---|
| 1,945,607 | 2/1934 | Herdman | 178—7.3 |
| 2,099,872 | 11/1937 | Stern | 178—7.6 |
| 2,989,643 | 6/1951 | Scanlone | 178—7.6 |
| 3,303,271 | 2/1967 | Hecker | 178—5 |

ROBERT L. GRIFFIN, *Primary Examiner.*

JOHN W. CALDWELL, *Examiner.*

J. A. ORSINO, *Assistant Examiner.*